United States Patent
Aaron (10) Patent No.: US 8,041,379 B2
(45) Date of Patent: Oct. 18, 2011

(54) REDUCING CO-INTERFERENCE BY HUSHING SELECTIVE CELLULAR DEVICES

(75) Inventor: Jeffrey A. Aaron, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 924 days.

(21) Appl. No.: 12/024,639

(22) Filed: Feb. 1, 2008

(65) Prior Publication Data

US 2009/0197628 A1    Aug. 6, 2009

(51) Int. Cl.
*H04B 7/00*    (2006.01)

(52) U.S. Cl. ........................ 455/522; 455/453

(58) Field of Classification Search ............ 455/24, 455/500, 501, 502, 503, 517, 522, 527, 63.1, 455/67.11, 69, 561, 570, 453
See application file for complete search history.

(56) References Cited

U.S. PATENT DOCUMENTS

| | | | |
|---|---|---|---|
| 6,577,875 B1 * | 6/2003 | Brouwer | 455/522 |
| 6,678,509 B2 * | 1/2004 | Skarman et al. | 455/232.1 |
| 7,308,282 B2 * | 12/2007 | Chen et al. | 455/522 |
| 7,783,301 B2 * | 8/2010 | Bornholdt | 455/456.1 |
| 2002/0077111 A1 * | 6/2002 | Spaling et al. | 455/453 |

* cited by examiner

*Primary Examiner* — Lana N Le
*Assistant Examiner* — Ping Hsieh
(74) *Attorney, Agent, or Firm* — Hope Baldauff Hartman, LLC (57) ABSTRACT

Embodiments described herein provide for reducing cellular co-interference. A primary cellular device is selected. A secondary cellular device that causes co-interference with the primary cellular device is also selected. Whether the primary cellular device is a transmitting device or a receiving device is determined. Upon determining that the primary cellular device is a transmitting device, a first hush command is transmitted to the primary cellular device. Upon determining that the primary cellular device is a receiving device, a second hush command is transmitted to the secondary cellular device. The first hush command instructs the primary cellular device to increase a first transmit power from the primary cellular device to a cellular tower. The second hush command instructs the secondary cellular device to decrease a second transmit power from the secondary cellular device to the cellular tower.

17 Claims, 4 Drawing Sheets

REDUCING CO-INTERFERENCE BY HUSHING SELECTIVE CELLULAR DEVICES

BACKGROUND

Cellular-related quality of service ("QoS") issues are a significant source of frustration for service providers as well as their customers and users of the customers' accounts. Common QoS issues include bandwidth limitations, jitter, delay and latency, packet loss, and interference. QoS issues may result in a number of problems for customers/users, potentially causing customers to change service providers. In one example, a customer may experience a "dropped call," in which a phone call unexpectedly ends. In another example, a customer may experience a slow data transfer rate that is not suitable for transferring high-bandwidth content, such as video and music. QoS problems may result in unacceptable quality of service, causing customer dissatisfaction ranging from annoyance to anger.

As cellular devices become more pervasive, the number of simultaneous users is bound to increase, especially in urban and metropolitan areas. One problem that arises when relatively close users simultaneously transmit data to and/or receive data from a cellular tower is co-interference. Co-interference generally occurs when radio frequency ("RF") signals between a first cellular device and a cellular tower interfere with RF signals between a second cellular device and the cellular tower.

The level of co-interference may be affected by the amount of transmission power utilized by transmitting cellular devices to a cellular tower. The amount of transmission power may be affected by a variety of factors. For example, to transmit more content or to transmit the content at a higher QoS, the transmission power is generally increased. Other factors, such as the presence of obstructions and increasing distance between the cellular device and tower, may also cause the transmission power to be increased, often in attempting to maintain satisfactory received signal levels as the path loss increased due to increased distance. As the level of co-interference increases, the QoS for the affected cellular devices may be reduced. Such a reduction in QoS may be unacceptable for certain users, such as business users, who pay a premium for and demand high QoS.

SUMMARY

Embodiments of the disclosure presented herein include methods, systems, and computer-readable media for reducing cellular co-interference. According to one aspect, a method for reducing cellular co-interference is provided. According to the method, a primary cellular device is selected. A secondary cellular device that causes co-interference with the primary cellular device is also selected. Whether the primary cellular device is a transmitting device or a receiving device is determined. Upon determining that the primary cellular device is a transmitting device, a first hush command is transmitted to the primary cellular device. Upon determining that the primary cellular device is a receiving device, a second hush command is transmitted to the secondary cellular device. The first hush command instructs the primary cellular device to increase a first transmit power from the primary cellular device to a cellular tower. The second hush command instructs the secondary cellular device to decrease a second transmit power from the secondary cellular device to the cellular tower.

According to another aspect, a system for reducing cellular co-interference is provided. The system includes a memory and a processor functionally coupled to the memory. The memory stores a program containing code for reducing cellular co-interference. The processor is responsive to computer-executable instructions contained in the program and operative to select a primary cellular device, select a secondary cellular device that causes co-interference with the primary cellular device, determine whether the primary cellular device is a transmitting device or a receiving device, upon determining that the primary cellular device is a transmitting device, transmit a first hush command to the primary cellular device, and upon determining that the primary cellular device is a receiving device, transmit a second hush command to the secondary cellular device. The first hush command instructs the primary cellular device to increase a first transmit power from the primary cellular device to a cellular tower. The second hush command instructs the secondary cellular device to decrease a second transmit power from the secondary cellular device to the cellular tower.

According to yet another aspect, a computer-readable medium having instructions stored thereon for execution by a processor to perform a method for reducing cellular co-interference is provided. According to the method, a primary cellular device is selected. A secondary cellular device that causes co-interference associated with the primary cellular device is also selected. Whether the primary cellular device is a transmitting device or a receiving device is determined. Upon determining that the primary cellular device is a transmitting device, that is to say a cellular device which is currently transmitting signals, a first hush command is transmitted to the primary cellular device. Upon determining that the primary cellular device is a receiving device, that is to say a cellular device which is currently receiving signals, a second hush command is transmitted to the secondary cellular device. The first hush command instructs the primary cellular device to increase a first transmit power from the primary cellular device to a cellular tower. The second hush command instructs the secondary cellular device to decrease a second transmit power from the secondary cellular device to the cellular tower.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The following detailed description is directed to methods, systems, and computer-readable media for reducing cellular co-interference by hushing selective cellular devices. In the following detailed description, references are made to the accompanying drawings that form a part hereof, and which are shown by way of illustration through specific embodiments or examples.

Cellular devices, such as cellular phones, smartphones, personal digital assistants ("PDAs"), and the like, by their nature enable users to communicate and access other cellular services while moving. Especially in urban and metropolitan areas, it can generally be expected that multiple users may simultaneously utilize their cellular devices while in close proximity. It can further be expected that, as each cellular device independently transmits data to and receives data from a cellular tower, the data streams across multiple cellular devices may overlap, thereby causing co-interference.

Co-interference between cellular devices can affect data transmissions and receptions between the cellular devices and the cellular tower. Among other problems, co-interference can increase noise levels, thereby reducing the signal-to-noise ("SNR") ratio. The increase in noise levels may also increase the bit error rate ("BER"), reduce available bandwidth, increase the amount of lost data, and increase delay and latency. A practical consequence of co-interference is a decrease in cellular quality of service ("QoS"), which may disrupt applications and services that are sensitive to QoS. For example, certain business applications or services may demand a consistently high level of QoS. Also, new applications may have very specific kinds of QoS sensitivities, such as, sensitivity to delay/latency or packet loss, sensitivity to burst errors exceeding a particular length, and the like.

One common type of co-interference occurs when a first cellular device is transmitting content to a cellular tower, while a second cellular device, which is near the first cellular device, is receiving content from the cellular tower. Generally, the closer the first cellular device is to the second cellular device, the greater the likelihood that co-interference between the cellular devices is negatively impacting the first cellular device and/or the second cellular device. Other factors, such as the signal strength between the cellular devices and the cellular tower, in other words the transmitter's signal transmit power which results in a particular received signal power at the receiver, may also increase the likelihood of co-interference.

Generally, interference including co-interference occurs at a receiver, or in other words, at a cellular device or cellular tower that is currently receiving. In a first case, when a cellular device is transmitting to a tower, interference can occur at the tower's receiver. In a second case, when a cellular device is receiving signals, interference can occur at that device's receiver. The second case commonly occurs when cellular devices are in close proximity such that one is transmitting and another is receiving. When the cellular devices are at the fringe of a cell, the transmitted signal from the cellular tower is at its weakest, and is thus most vulnerable to interference.

It is generally well understood that high power transmissions increase the possibility and the severity of co-interference between cellular devices. For example, high power transmissions may be utilized for applications and services that require high bandwidth and high QoS. Additional power may also be utilized when the signal strength between the cellular device and the cellular tower is low or if obstructions are present between cellular device and the cellular tower. By controlling the transmission power of selective and appropriate cellular devices, co-interference between cellular devices can be significantly reduced.

The embodiments described herein reduce co-interference by hushing selective cellular devices. As used herein, "hushing" refers to increasing or reducing the transmission power of one or more cellular devices. In effect, hushing decreases the QoS for one cellular device for the benefit of increasing the QoS for another cellular device. For the sake of illustration, the disclosure herein refers to a primary cellular device and one or more secondary cellular devices. The primary cellular device generally refers to the cellular device for which QoS is increased as result of hushing. The secondary cellular devices generally refer to the cellular devices for which QoS is decreased as a result of hushing. The secondary cellular devices may be within a given proximity from the primary cellular devices. At least a portion of the secondary cellular devices may cause co-interference with the primary cellular devices.

Since hushing refers to increasing or reducing the transmission power, hushing is generally applicable in two scenarios. In the first scenario, the primary cellular device is a receiving cellular device (i.e., receiving from the cellular tower) and the secondary cellular devices are transmitting cellular devices (i.e., transmitting to the cellular tower). In this first scenario, by reducing the transmission power of one or more secondary cellular devices, the QoS of the secondary cellular devices may be reduced for the benefit of increasing the QoS of the primary cellular device. In a second scenario, the primary cellular device is a transmitting cellular device and the secondary cellular devices are receiving cellular devices. In this second scenario, by increasing the transmission power of the primary cellular device, the QoS of the primary cellular device may be increased at the detriment of reducing the QoS of the secondary cellular devices.

The cellular service provider, for example, may desire to increase QoS of premium users at the potential expense of decreasing QoS of non-premium users. In some cases, the non-premium users who transmit low bandwidth content, such as text and voice, may not even notice the decrease in QoS compared to premium users who receive high bandwidth content, such as streaming music and video. It should be noted that the cellular service provider may desire to increase QoS of customers who are using services and applications which are relatively sensitive to QoS at the potential expense of decreasing QoS of customers who are using services and applications which are relatively insensitive to QoS. In many cases, there may be a general correlation between premium users and those customers using services and applications which are relatively sensitive to QoS. Likewise, there is likely to be a general correlation between non-premium users and those customers using services and applications which are relatively insensitive to QoS. Services and applications which are relatively sensitive to QoS tend to be categorized as premium services due to their higher bandwidth requirements and/or other QoS-relevant aspects.

According to exemplary embodiments, a computer system may be configured to select secondary cellular devices near a primary cellular device. In one embodiment, the secondary cellular devices are selected based on the negative impact (e.g., an amount of co-interference) caused by the secondary cellular devices upon the primary cellular device. Upon selecting the secondary cellular devices, the computer system determines a cost-benefit ratio for each of the selected secondary cellular devices. For example, the cost/benefit ratio may weigh the negative impact (i.e., the cost) resulting from a decrease in QoS of the secondary cellular devices against the positive impact (i.e., the benefit) resulting from an increase in QoS of or associated with the primary cellular device. The computer system may apply hushing for only those secondary cellular devices that meet a threshold of the cost/benefit ratio.

For those secondary cellular devices that meet the threshold, the computer system may determine an amount of hushing for each of the secondary cellular devices and transmit corresponding hush commands to the appropriate cellular devices. In one embodiment, the amount of hushing is sufficient to reduce or eliminate any co-interference between the secondary cellular devices and the primary cellular device. The amount of hushing may increase if the secondary cellular devices are closer to the primary cellular device or if the secondary cellular devices are transmitting with more power. Similarly, the amount of hushing may decrease if the secondary cellular devices are farther from the primary cellular device or if the secondary cellular devices are transmitting with less power.

It should be noted that the amount of hushing can be finely tuned, optimizing the hushing to at least a first approximation. This may be accomplished by using the distance between the interfering transmitter and the interfered-with receiver. In an example, the amount of hushing may increase as this distance decreases. Similarly, the amount of hushing may decrease as this distance increases. The change to the amount of hushing may be proportional to the change in the distance. The distance can be calculated mathematically given both locations, which may be determined based on global positioning system ("GPS") location fixes, for example.

In one embodiment, the hushing is performed in accordance with a given schedule. The schedule may specify increases and/or decreases in the amount of hushing performed in terms of magnitude and/or duration. For example, the hushing and/or allowable range of hushing may increase during business or peak hours and decrease during non-business or off-peak hours. The schedule may include time offsets and other delays. The schedule may also be configured in accordance with policy rules associated with the cellular service provider. These policy rules may include, for example, certain bandwidth requirements or considerations inherent in the cellular network or applicable in various applications executed by the cellular devices.

Figure 1:
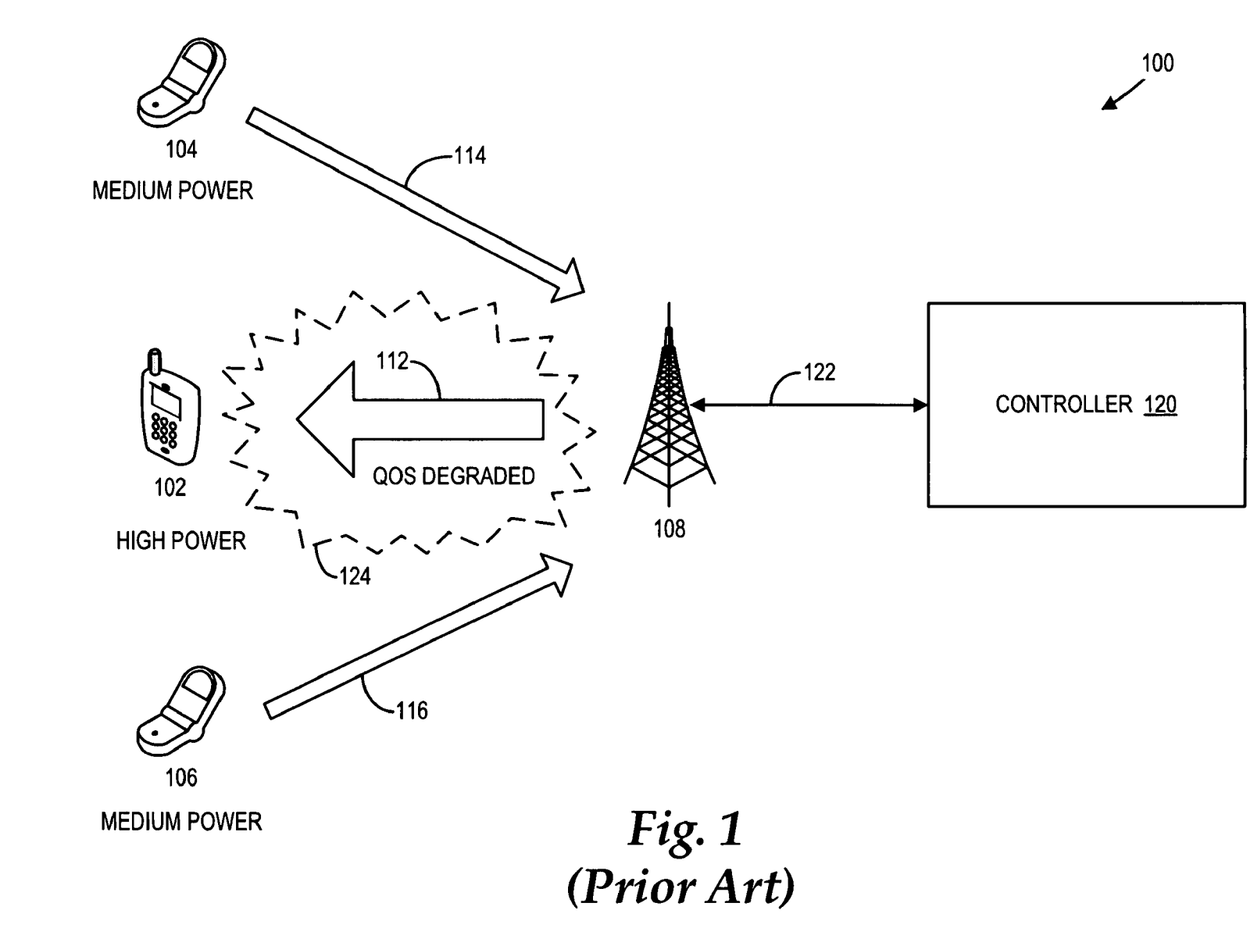
FIG. 1 is a simplified diagram illustrating a conventional cellular network configuration involving co-interference between cellular devices.
Figure 2:
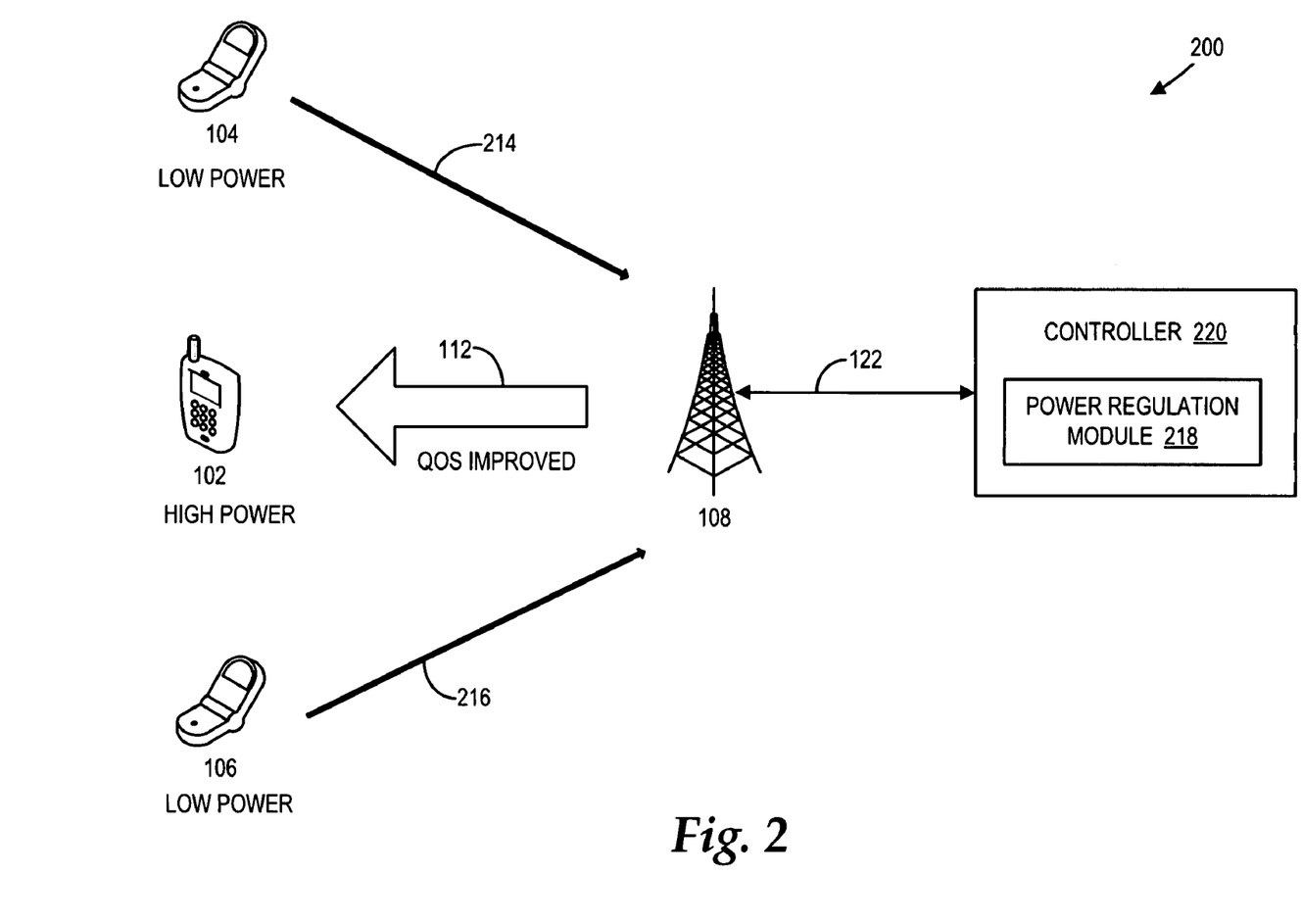
FIG. 2 is a simplified diagram illustrating a cellular network configuration for reducing co-interference between cellular devices, in accordance with exemplary embodiments.

Referring now to the drawings, it is to be understood that like numerals represent like elements through the several figures, and that not all components and/or steps described and illustrated with reference to the figures are required for all embodiments. For the sake of simplicity, only the scenario where the primary cellular device is the receiving cellular device and the secondary cellular devices are the transmitting cellular devices is illustrated in FIGS. 1 and 2. However, it should be appreciated that one skilled in the art will appreciate that the embodiments illustrated in FIGS. 1 and 2 are similarly applicable to the scenario where the primary cellular device is the transmitting cellular device and the secondary cellular devices are the receiving cellular devices.

Turning now to FIG. 1, a simplified diagram illustrating a conventional cellular network configuration 100 is shown. The conventional cellular network configuration 100 includes a first cellular device 102, a second cellular device 104, and a third cellular device 106. The first cellular device 102 communicates with a cellular tower 108 via a first wireless link 112. The second cellular device 104 and the third cellular device 106 communicate with the cellular tower 108 via a second wireless link 114 and a third wireless link 116, respectively. Examples of the cellular devices 102, 104, 106 include, but are not limited to, cellular phones, smartphones, personal digital assistants ("PDAs"), and the like. The cellular tower 108 is operatively coupled to a controller 120 via a network 122. In one embodiment, the controller 120 manages the data transmission to and from the cellular tower 108.

As illustrated in FIG. 1, the arrow representing the first wireless link 112 is pointed from the cellular tower 108 to the first cellular device 102. In contrast, the arrows representing the second wireless link 114 and the third wireless link 116 are pointed from the cellular tower 108 to the second cellular device 104 and the third cellular device 106. The direction of the arrows indicates a current flow of data. In particular, the arrow representing the first wireless link 112 indicates that data transmissions are flowing from the cellular tower 108 to the first cellular device 102. The arrows representing the second wireless link 114 and the third wireless link 116 indicate that data transmissions are flowing from the second cellular device 104 and the third cellular device 106 to the cellular tower 108. It should be appreciated that while the current flow of data is shown in FIG. 1 as unidirectional, the wireless links 112, 114, 116 may be bidirectional.

Also as illustrated in FIG. 1, the arrows representing the second wireless link 114 and the third wireless link 116 are about the same width. In contrast, the arrow representing the first wireless link 112 is substantially larger than the arrows representing the second wireless link 114 and the third wireless link 116. In one embodiment, the width of the arrows indicates the amount of data (i.e., the bandwidth) being transmitted. In particular, the amount of data being transmitted from the second cellular device 104 to the cellular tower 108 is about the same as the amount of data being transmitted from the third cellular device 106 to the cellular tower 108 because the arrows representing the second wireless link 114 and the third wireless link 116 are about the same width. The amount of data being transmitted from the cellular tower 108 to the first cellular device 102 is greater than the amount of data be transmitted from the second cellular device 104 and the third cellular device 106 to the cellular tower 108 because the arrow representing the first wireless link 112 is wider than the arrows representing the second wireless link 114 and the third wireless link 116.

For the sake of illustration, the transmissions to the first cellular device 102 from the cellular tower 108 are referred to herein as high power transmissions. Further, the transmissions to the cellular tower 108 from the second cellular device 104 and the third cellular device 106 are referred to herein as medium power transmissions. The high power transmissions utilize more power, for example, to transmit more data, or data at a faster rate, than the medium power transmissions.

In one embodiment, surrounding the first wireless link 112 is a starburst representing co-interference 124 caused by the second wireless link 114 and the third wireless link 116. In particular, the medium transmissions to the cellular tower 108 from the second cellular device 104 and the third cellular device 106 cause the co-interference 124 with the high power transmissions to the first cellular device 102 from the cellular tower 108.

Turning now to FIG. 2, a simplified diagram illustrating a cellular network configuration 200 is shown, in accordance with exemplary embodiments. Like the conventional cellular network configuration 100, the cellular network configuration 200 includes at least the first cellular device 102, the second cellular device 104, and the third cellular device 106. The first cellular device 102 communicates with the cellular tower 108 via the first wireless link 112. The second cellular device 104 and the third cellular device 106 communicate with the cellular tower 108 via a second wireless link 214 and a third wireless link 216, respectively. The cellular tower 108 is operatively coupled to a controller 220 via the network 122.

As illustrated in FIG. 2, a power regulation module 218 reduces or eliminates the co-interference 124 by decreasing the amount of transmission power utilized by the second cellular device 104 and the third cellular device 106 (also referred to herein as the secondary cellular devices) for the benefit of the first cellular device 102 (also referred to herein as the primary cellular device). The medium power transmissions utilized by the second cellular device 104 and the third cellular device 106 across the second wireless link 114 and the third wireless link 116, respectively, are replaced with low power transmissions across the second wireless link 214 and the third wireless link 216. In contrast, if the first cellular device 102 is a transmitting device and the second cellular device 104 and the third cellular device 106 are receiving devices, then the transmission power utilized by the first cellular device 102 may be increased at the detriment of the second cellular device 104 and the third cellular device 106.

According to exemplary embodiments, the power regulation module 218 reduces the power of the second wireless link 114 and the third wireless link 116 to form the second wireless link 214 and the third wireless link 216, respectively. In particular, as illustrated in FIGS. 1 and 2, the width of the second wireless link 214 is less than the second wireless link 114, thereby indicating that the second wireless link 214 transmits with less power than the second wireless link 114. Similarly, the width of the third wireless link 216 is less than the third wireless link 116, thereby indicating that the third wireless link 216 transmits with less power than the third wireless link 116. The operation of the power regulation module 218 is described in greater detail below with respect to FIG. 3.

In one embodiment, the first cellular device 102 is a device associated with a service plan that demands a high QoS, and the second cellular device 104 and the third cellular device 106 are devices associated with a service plan that demands a lower QoS than the first cellular device 102. In this case, the cellular devices that are associated with service plans that demand high QoS may be designated primary cellular devices, while other cellular devices that are associated with service plans that demand a lower QoS may be designated secondary cellular devices. The primary devices and the secondary devices may be selected by other suitable criteria.

Figure 3:
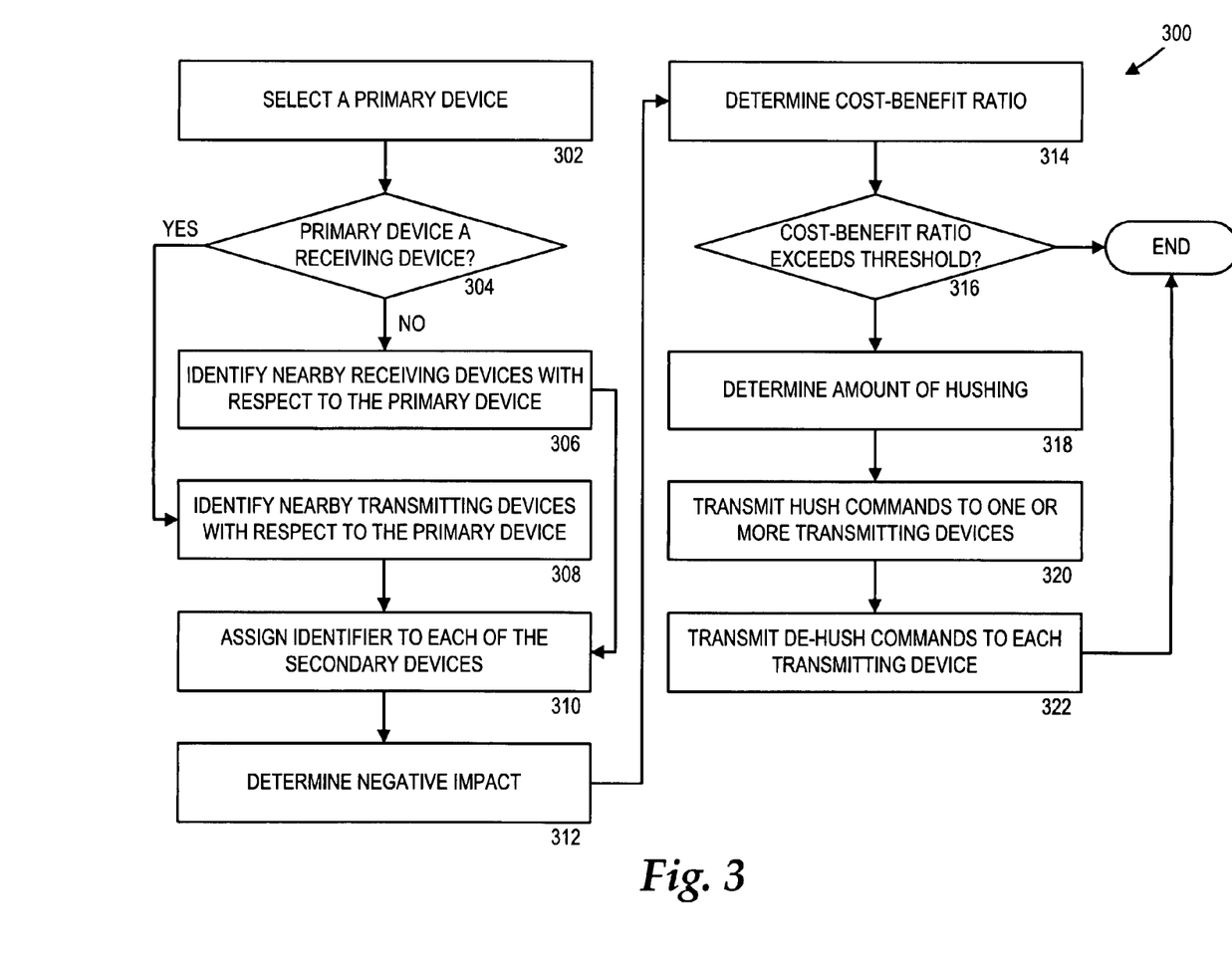
FIG. 3 is a flow diagram illustrating a method for reducing co-interference between cellular devices, in accordance with exemplary embodiments.

Turning now to FIG. 3, a flow diagram illustrating a method 300 of reducing co-interference between cellular devices is shown, in accordance with exemplary embodiments. According to the method 300, the power regulation module 218 selects (at 302) a primary cellular device. In one embodiment, the power regulation module 218 selects a cellular device as the primary cellular device based on a class of subscription associated with the cellular device. In the illustrative example illustrated in FIG. 2, the power regulation module 218 may select the first cellular device 102 as the primary cellular device. The first cellular device 102 may be associated with a premium subscription plan that demands a high QoS. The primary cellular device generally refers to the cellular device that is benefited by the hushing performed by the power regulation module 218.

Upon selecting the primary cellular device, the power regulation module 218 determines (at 304) whether the primary cellular device is a receiving cellular device or a transmitting cellular device. As used herein, a receiving cellular device is a cellular device that is currently receiving content from the cellular tower 108, while a transmitting cellular device is a cellular device that is currently transmitting content to the cellular tower 108. As illustrated in FIGS. 1 and 2, the cellular tower 108 is currently transmitting content to the first cellular device 102 via the first wireless link 112. Thus, if the first cellular device 102 is selected as the primary cellular device, then the power regulation module 218 may determine that the first cellular device 102 is a receiving cellular device.

If the power regulation module 218 determines that the primary cellular device is a transmitting cellular device, then the power regulation module 218 identifies (at 306) nearby receiving cellular devices with respect to the primary cellular device. Alternatively, if the power regulation module 218 determines that the primary cellular device is a receiving cellular device, then the power regulation module 218 identifies (at 308) nearby transmitting cellular devices with respect to the primary cellular device. The nearby receiving devices identified in operation 306 and the nearby transmitting devices identified in operation 308 are generally referred to herein as secondary cellular devices. In the example illustrated in FIG. 2, the power regulation module 218 may identify the second cellular device 104 and the third cellular device 106 as nearby transmitting cellular devices with respect to the first cellular device 102.

In one embodiment, the power regulation module 218 identifies the secondary cellular devices by selecting cellular devices that are within a given distance from the primary cellular device and are associated with a certain class of subscription. The given distance may be a predetermined threshold range within which two cellular devices are likely to cause co-interference. The distance between cellular devices may be determined based on the locations of the cellular devices. The locations of the cellular devices may be identified by any suitable technique including, but not limited to, GPS, triangulation, and/or a geographic information system ("GIS"). The certain class of subscription may be a non-premium subscription plan that demands lower QoS than the premium subscription plan. For example, the non-premium subscription plan may cost less than the premium subscription plan.

Upon identifying the nearby secondary cellular devices, the power regulation module 218 assigns (at 310) an identifier or other descriptor to each of the secondary cellular devices. The power regulation module 218 may utilize the identifier to later identify each of the secondary cellular devices. An example of an identifier may be a serial number that uniquely identifies each of the secondary cellular devices.

Upon assigning the identifier to each of the secondary cellular devices, such as the second cellular device 104 and the third cellular device 106, the power regulation module 218 determines or estimates (at 312) a negative impact (e.g., amount of co-interference) caused by the second cellular device 104 and the third cellular device 106 upon the first cellular device 102. If the secondary cellular devices 104, 106 are transmitting cellular devices, then the power regulation module 218 may determine or estimate the negative impact upon the secondary cellular devices 104, 106 as the transmission power utilized by the secondary cellular devices 104, 106 is decreased. If the secondary cellular devices 104, 106 are receiving cellular devices, then the power regulation module 218 may determine or estimate the negative impact upon the secondary cellular devices 104, 106 as the amount of transmission power utilized by the primary cellular device 102 is increased. In the illustrative example of FIG. 2, the first cellular device 102, which is designated as a primary cellular device, is a receiving cellular device, while the second cellular device 104 and the third cellular device 106, which are designated as secondary cellular devices, are transmitting cellular devices. Accordingly, the power regulation module 218 may determine the negative impact upon the second cellular device 104 and the third cellular device 106 as the transmission power utilized by the second cellular device 104 and the third cellular device 106 is decreased.

Upon determining the negative impact on the secondary cellular devices 104, 106, the power regulation module 218 determines (at 314) a cost-benefit ratio for performing hushing to reduce the negative impact. In one embodiment, the cost in the cost-benefit ratio refers to the collateral harm caused by hushing the secondary cellular devices 104, 106, and the benefit in the cost-benefit ratio generally refers to the QoS improvement as a result of hushing the secondary cellular devices. The cost-benefit ratio may be determined based on any suitable factors including, but not limited to, power, path loss, co-interference, and noise. It should be noted that the severity of co-interference may increase as the distance between interfering transmitter and interfered-with receiver decreases. As such, the cost-benefit ratio as well as the amount of hushing applied may be at least partially based on this distance.

In particular, in a first example, the cost-benefit ratio may be based on the relative QoS needs of the primary cellular device 102 and the secondary cellular devices 104, 106. Hushing may decrease the QoS of the secondary cellular devices 104, 106 below an acceptable level. In a second example, the cost-benefit ratio may be based on the determined or estimated transmit duty cycle of the transmitting primary cellular device 102 or the transmitting secondary cellular devices 104, 106. The transmit duty cycle generally refers to the average percentage "on time" within a given time window. In a third example, the cost-benefit ratio may be based on the proximity between the secondary cellular devices 104, 106 and the primary cellular device 102. In a fourth example, the cost-benefit ratio may be determined in accordance with policy rules associated with the cellular service provider or with the subscription plans associated with the primary cellular device 102 and/or the secondary cellular devices 104, 106. In a fifth example, the cost-benefit ratio may be determined based on various numbers and/or configurations of the secondary cellular devices for which hushing is applied or affects. In a sixth example, the cost-benefit ratio may be determined based on the aggregate harm experienced by two or more of the secondary cellular devices 104, 106 for which hushing is applied or affects. It should be noted that in some cases, two or more of these approaches may be utilized in a weighted combined fashion in order to determine an overall cost-benefit ratio that takes into account a plurality of the relevant factors.

Upon determining the cost-benefit ratio, the power regulation module 218 determines (at 316) whether the cost-benefit ratio exceeds a ratio threshold. In one embodiment, the ratio threshold is a predetermined cost-benefit ratio value at which the benefit of performing hushing sufficiently outweighs the anticipated cost. If the cost-benefit ratio is below the ratio threshold, then the method 300 terminates. If the cost-benefit ratio is above the ratio threshold, then the method 300 proceeds to the next operation, where the power regulation module 218 determines (at 318) the amount of hushing to be applied to the transmitting primary cellular device or each of the transmitting secondary cellular devices.

In one embodiment, the amount of hushing is determined based on the cost-benefit ratio and/or the factors utilized to determine the cost-benefit ratio. In one example, the amount of hushing may be determined based on the determined negative impact of the co-interference caused by the secondary cellular devices 104, 106 upon the primary cellular device 102. As was mentioned above, this may be calculated and/or estimated via distance between interfering transmitter and interfered-with receiver, possibly with either selective or comprehensive additional considerations of path loss, intervening terrain, atmospheric factors, rainfall/precipitation conditions, and the like. In other examples, the amount of hushing may be determined based on distance between the primary cellular device 102 and the secondary cellular devices 104, 106, various policy rules, profiles, and database parameters.

Profiles may essentially be simple or complex categories in which users have been placed. Examples may include, but are not limited to, a power user versus a novice user, a Midwestern adult versus an East Coast teenager, and a business user versus a private user. Associated database parameters may then store values and/or settings associated with various aspects or characteristics of the profiles.

If the primary cellular device 102 is a transmitting device, then hushing may involve increasing the transmission power of the primary cellular device 102 at the detriment of the secondary cellular devices 104, 106. In this case, the amount of hushing refers to the amount by which the transmission power of the primary cellular device 102 is increased. If the primary cellular device 102 is a receiving device, then hushing may involve decreasing the transmission power of the secondary cellular devices 104, 106 at the detriment of the secondary cellular devices 104, 106 in order to benefit the primary cellular device 102. In this case, the amount of hushing refers to the amount by which the transmission power of the secondary cellular devices 104, 106 is decreased. The amount of hushing may be modified in steps, via percentage adjustments, via a mathematical multiplier or other suitable technique.

In one embodiment, the amount of hushing is an explicit value. For example, the explicit value may be a positive or negative decibel value. In a further embodiment, the amount of hushing is a bias value. For example, the bias value may be a value that is only a portion of a larger process or value by which the amount of hushing is determined. That is, the bias value may be arranged to indirectly, yet substantially, affect the larger process.

Upon determining the amount of hushing, the power regulation module 218 transmits (at 320) hush commands to one or more of the transmitting cellular devices in accordance with the amount of hushing determined in operation 318. If the primary cellular device 102 is a transmitting cellular device, then the hush commands are transmitted to the transmitting primary cellular device 102. In this case, the hush commands may instruct the transmitting primary cellular device 102 to increase the transmission power in accordance with the amount of hushing determined in operation 318. If the primary cellular device 102 is a receiving cellular device, then the hush commands are transmitted to one or more of the transmitting secondary cellular devices 104, 106. In this case, the hush commands may instruct the transmitting secondary devices 104, 106 to decrease the transmission power in accordance with the amount of hushing determined in operation 318.

In one embodiment, the hush commands are transmitted in accordance with a schedule. The schedule may adjust the hush commands in terms of magnitude and/or duration depending on the time that the hushing is performed. For example, the magnitude and duration of the hush commands may be different during peak times and off-times. In a further embodiment, the hush commands may be transmitted in accordance with a triggering event. Examples of triggering events may include, but are not limited to, received signals, transmissions from particular cellular devices, and predetermined thresholds.

Upon transmitting the hush commands to the transmitting primary cellular device 102 or the transmitting secondary cellular devices 104, 106, the transmitting primary cellular device 102 or the transmitting secondary cellular devices 104, 106 perform the hush commands. In one embodiment, the power regulation module 218 receives feedback from the primary cellular device 102 and/or the secondary cellular devices 104, 106 after the hush commands have been performed. The feedback may indicate the level of success of the current hush commands. The feedback may be utilized by the power regulation module 218 to adjust and resend the hush commands to the transmitting primary cellular device 102 or the transmitting secondary cellular devices 104, 106.

After the hushing process is complete, the power regulation module 218 transmits (at 322) de-hush commands to the transmitting primary cellular device 102 or the transmitting secondary cellular devices 104, 106. In one embodiment, the de-hush commands instruct the transmitting primary cellular device 102 or the transmitting secondary cellular devices 104, 106 to terminate the hushing process. Like the hush commands, the de-hush commands may also be transmitted in accordance with a schedule or a triggering event.

Figure 4:
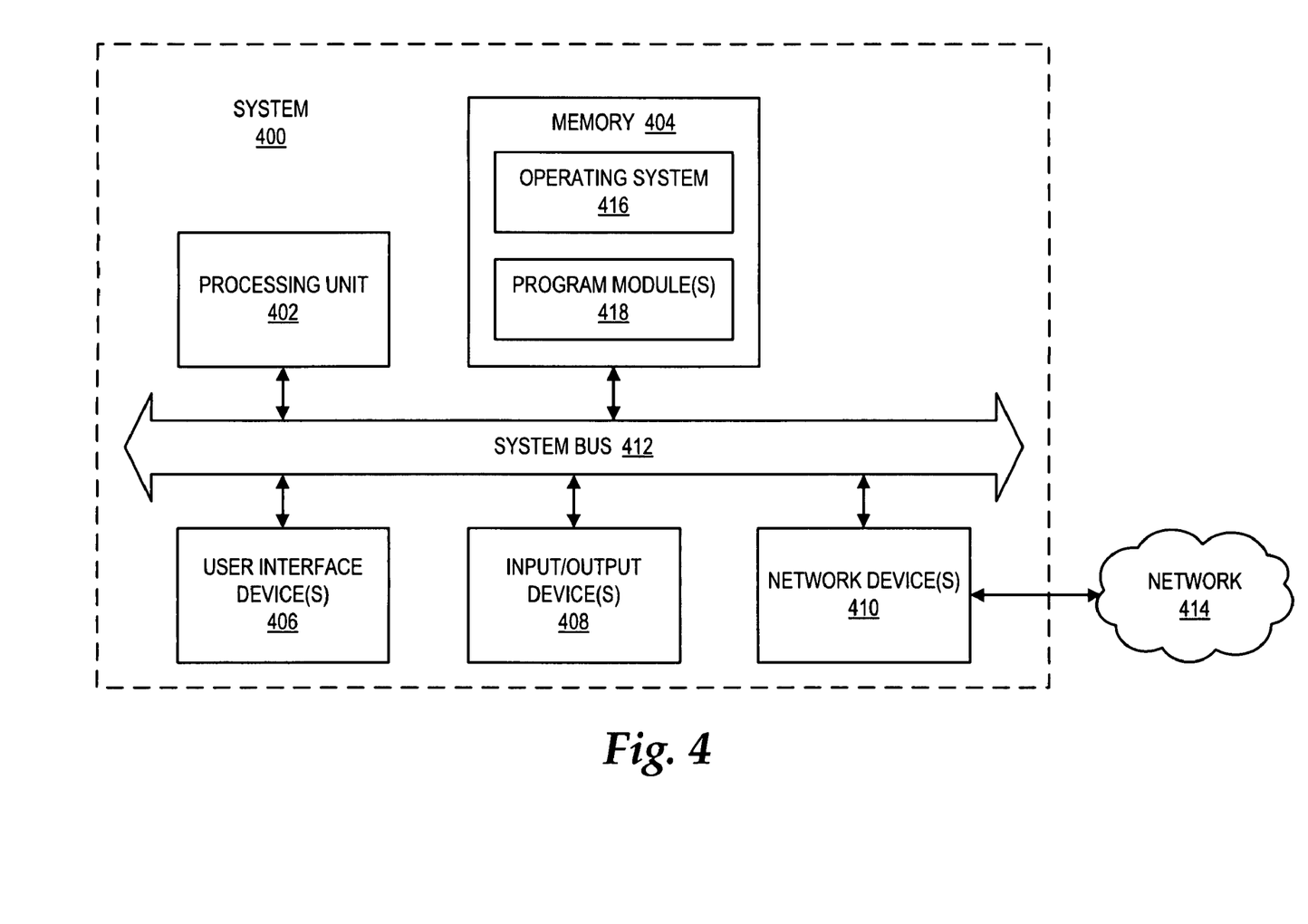
FIG. 4 is a block diagram illustrating the system configured to reduce co-interference between cellular devices, in accordance with exemplary embodiments.

FIG. 4 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 4 is a block diagram illustrating a computer system 400 configured to reduce co-interference between cellular devices, in accordance with exemplary embodiments. Examples of the computer system 400 may include the cellular devices 102, 104, 106 and the controller 220. The computer system 400 includes a processing unit 402, a memory 404, one or more user interface devices 406, one or more input/output ("I/O") devices 408, and one or more network devices 410, each of which is operatively connected to a system bus 412. The bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 404 communicates with the processing unit 402 via the system bus 412. In one embodiment, the memory 404 is operatively connected to a memory controller (not shown) that enables communication with the processing unit 402 via the system bus 412. The memory 404 includes an operating system 416 and one or more program modules 418, according to exemplary embodiments. Examples of operating systems, such as the operating system 416, include, but are not limited to, WINDOWS, WINDOWS CE, and WINDOWS MOBILE from MICROSOFT CORPORATION, LINUX, SYMBIAN from SYMBIAN LIMITED, BREW from QUALCOMM CORPORATION, MAC OS from APPLE CORPORATION, and FREEBSD operating system. Examples of the program modules 418 include the power regulation module 218. In one embodiment, the program modules 418 are embodied in computer-readable media containing instructions that, when executed by the processing unit 402, performs the method 300 for reducing co-interference between cellular devices, as described in greater detail above with respect to FIG. 3. According to further embodiments, the program modules 418 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400.

The user interface devices 406 may include one or more devices with which a user accesses the computer system 400. The user interface devices 406 may include, but are not limited to, computers, servers, personal digital assistants, cellular phones, or any suitable computing devices. The I/O devices 408 enable a user to interface with the program modules 418. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer.

The network devices 410 enable the computer system 400 to communicate with other networks or remote systems via a network 414. Examples of the network 414 may include, but are not limited to, the network 122 and the wireless links 112, 214, 216. Examples of the network devices 410 may include, but are not limited to, a modem, a radio frequency ("RF") or infrared ("IR") transceiver, a telephonic interface, a bridge, a router, or a network card. The network 414 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 414 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for reducing cellular co-interference, comprising:
   selecting a primary cellular device;
   selecting a secondary cellular device that causes co-interference with the primary cellular device;
   determining whether the primary cellular device is one of a transmitting device and a receiving device;
   upon determining that the primary cellular device is a transmitting device, transmitting a first hush command to the primary cellular device, the first hush command instructing the primary cellular device to increase a first transmit power from the primary cellular device to a cellular tower;
   upon determining that the primary cellular device is a receiving device, transmitting a second hush command to the secondary cellular device, the second hush command instructing the secondary cellular device to decrease a second transmit power from the secondary cellular device to the cellular tower;
   determining a cost-benefit ratio for transmitting one of the first hush command to the primary cellular device and the second hush command to the secondary cellular device;
   determining whether the cost-benefit ratio surpasses a cost-benefit threshold;
   upon determining that the cost-benefit ratio surpasses the cost-benefit threshold, determining an amount of hushing to be performed based on distance between the primary cellular device and the secondary cellular device, wherein as the distance increases, the amount of hushing decreases, and wherein as the distance decreases, the amount of hushing increases; and
   determining one of the first hush command and the second hush command based on the amount of hushing.

2. The method of claim 1, wherein selecting a secondary cellular device that causes co-interference with the primary cellular device comprises selecting the secondary cellular device based on one of a distance from the secondary cellular device to the primary cellular device and a signal strength between the secondary cellular device and the primary cellular device.

3. The method of claim 1, wherein determining a cost-benefit ratio for transmitting one of the first hush command to the primary cellular device and the second hush command to the secondary cellular device comprises:
   determining a cost to the secondary cellular device resulting from decreased quality of service caused by a performance of one of the first hush command and the second hush command;
   determining a benefit to the primary cellular device resulting from increased quality of service caused by the performance of one of the first hush command and second hush command; and
   determining the cost-benefit ratio based on the cost to the secondary cellular device and the benefit to the primary cellular device.

4. The method of claim 1, further comprising:
   determining a schedule specifying limitations on magnitude and duration of hushing allowed at various times;
   wherein transmitting a first hush command to the primary cellular device comprises:
     adjusting the first hush command based on the schedule, and
     transmitting the adjusted first hush command to the primary cellular device in accordance with the schedule; and
   wherein transmitting a second hush command to the secondary cellular device comprises:
     adjusting the second hush command based on the schedule, and
     transmitting the adjusted second hush command to the secondary cellular device in accordance with the schedule.

5. The method of claim 1, wherein transmitting a first hush command to the primary cellular device comprises transmitting the first hush command to the primary cellular device in response to a trigger event; and
   wherein transmitting a second hush command to the secondary cellular device comprises transmitting the second hush command to the secondary cellular device in response to the trigger event.

6. The method of claim 1, further comprising:
   receiving a first feedback from the primary cellular device upon a performance of one of the first hush command and the second hush command;
   receiving a second feedback from the secondary cellular device upon the performance of one of the first hush command and the second hush command; and
   adjusting one of the first hush command and the second hush command based on the first feedback and the second feedback.

7. A system for reducing cellular co-interference, comprising:
   a memory for storing a program containing code for reducing cellular co-interference; and
   a processor functionally coupled to the memory, the processor being responsive to computer-executable instructions contained in the program and operative to at least:
     select a primary cellular device,
     select a secondary cellular device that causes co-interference with the primary cellular device,
     determine whether the primary cellular device is one of a transmitting device and a receiving device,
     upon determining that the primary cellular device is a transmitting device, transmit a first hush command to the primary cellular device, the first hush command instructing the primary cellular device to increase a first transmit power from the primary cellular device to a cellular tower,
     upon determining that the primary cellular device is a receiving device, transmit a second hush command to the secondary cellular device, the second hush command instructing the secondary cellular device to decrease a second transmit power from the secondary cellular device to the cellular tower, determine a cost-benefit ratio for transmitting one of the first hush command to the primary cellular device and the second hush command to the secondary cellular device, determine whether the cost-benefit ratio surpasses a cost-benefit threshold, upon determining that the cost-benefit ratio surpasses the cost-benefit threshold, determine an amount of hushing to be performed based on a distance between the primary cellular device and the secondary cellular device, wherein as the distance increases, the amount of hushing decreases, and wherein as the distance decreases, the amount of hushing increases, and determine one of the first hush comma and the second hush command based on the amount of hushing.

8. The system of claim 7, wherein selecting a secondary cellular device that causes co-interference with the primary cellular device comprises selecting the secondary cellular device based on one of a distance from the secondary cellular device to the primary cellular device and a signal strength between the secondary cellular device and the primary cellular device.

9. The system of claim 7, wherein to determine a cost-benefit ratio for transmitting one of the first hush command to the primary cellular device and the second hush command to the secondary cellular device, the processor is further operative to at least:

determine a cost to the secondary cellular device resulting from decreased quality of service caused by a performance of one of the first hush command and the second hush command, determine a benefit to the primary cellular device resulting from increased quality of service caused by the performance of one of the first hush command and second hush command, and determine the cost-benefit ratio based on the cost to the secondary cellular device and the benefit to the primary cellular device.

10. The system of claim 7, the processor being further operative to determine a schedule specifying limitations on magnitude and duration of hushing allowed at various times, wherein to transmit a first hush command to the primary cellular device, the processor is further operative to at least adjust the first hush command based on the schedule, and transmit the adjusted first hush command to the primary cellular device in accordance with the schedule, and wherein to transmit a second hush command to the secondary cellular device, the processor is further operative to at least adjust the second hush command based on the schedule, and transmit the adjusted second hush command to the secondary cellular device in accordance with the schedule.

11. The system of claim 7, wherein to transmit a first hush command to the primary cellular device, the processor is further operative to transmit the first hush command to the primary cellular device in response to a trigger event, and wherein to transmit a second hush command to the secondary cellular device, the processor is further operative to at least transmit the second hush command to the secondary cellular device in response to the trigger event.

12. A non-transitory computer-readable medium having instructions stored thereon for execution by a processor to provide a method for reducing cellular co-interference, the method comprising:

selecting a primary cellular device;

selecting a secondary cellular device that causes co-interference with the primary cellular device;

determining whether the primary cellular device is one of a transmitting device and a receiving device;

upon determining that the primary cellular device is a transmitting device, transmitting a first hush command to the primary cellular device, the first hush command instructing the primary cellular device to increase a first transmit power from the primary cellular device to a cellular tower;

upon determining that the primary cellular device is a receiving device, transmitting a second hush command to the secondary cellular device, the second hush command instructing the secondary cellular device to decrease a second transmit power from the secondary cellular device to the cellular tower;

determining a cost-benefit ratio for transmitting the first hush command to one of the primary cellular device and the second hush command to the secondary cellular device;

determining whether the cost-benefit ratio surpasses a cost-benefit threshold;

upon determining that the cost-benefit ratio surpasses the cost-benefit threshold, determining an amount of hushing to be performed based on a distance between the primary cellular device and the secondary cellular device, wherein as the distance increases, the amount of hushing decreases, and wherein as the distance decreases, the amount of hushing increases; and determining one of the first hush command and the second hush command based on the amount of hushing.

13. The non-transitory computer-readable medium of claim 12, wherein selecting a secondary cellular device that causes co-interference with the primary cellular device comprises selecting the secondary cellular device based on one of a distance from the secondary cellular device to the primary cellular device and a signal strength between the secondary cellular device and the primary cellular device.

14. The non-transitory computer-readable medium of claim 12, wherein determining a cost-benefit ratio for transmitting one of the first hush command to the primary cellular device and the second hush command to the secondary cellular device comprises:

determining a cost to the secondary cellular device resulting from decreased quality of service caused by a performance of one of the first hush command and the second hush command;

determining a benefit to the primary cellular device resulting from increased quality of service caused by the performance of one of the first hush command and second hush command; and determining the cost-benefit ratio based on the cost to the secondary cellular device and the benefit to the primary cellular device.

15. The non-transitory computer-readable medium of claim 12, the method further comprising:

determining a schedule specifying limitations on magnitude and duration of hushing allowed at various times;

wherein transmitting a first hush command to the primary cellular device comprises:

adjusting the first hush command based on the schedule, and transmitting the adjusted first hush command to the primary cellular device in accordance with the schedule; and wherein transmitting a second hush command to the secondary cellular device comprises:
adjusting the second hush command based on the schedule, and
transmitting the adjusted second hush command to the secondary cellular device in accordance with the schedule.

16. The non-transitory computer-readable medium of claim 12, wherein transmitting a first hush command to the primary cellular device comprises transmitting the first hush command to the primary cellular device in response to a trigger event; and wherein transmitting a second hush command to the secondary cellular device comprises transmitting the second hush command to the secondary cellular device in response to the trigger event.

17. The non-transitory computer-readable medium of claim 12, the method further comprising:
receiving a first feedback from the primary cellular device upon a performance of one of the first hush command and the second hush command;
receiving a second feedback from the secondary cellular device upon the performance of one of the first hush command and the second hush command; and
adjusting one of the first hush command and the second hush command based on the first feedback and the second feedback.

* * * * *

UNITED STATES PATENT AND TRADEMARK OFFICE
CERTIFICATE OF CORRECTION

PATENT NO. : 8,041,379 B2
APPLICATION NO. : 12/024639
DATED : October 18, 2011
INVENTOR(S) : Jeffrey A. Aaron Page 1 of 1

It is certified that error appears in the above-identified patent and that said Letters Patent is hereby corrected as shown below:

In Claim 7, Column 15, Line 17, please delete the word "comma" and replace with the word --command--.

Signed and Sealed this
Twenty-second Day of November, 2011

David J. Kappos
*Director of the United States Patent and Trademark Office*